United States Patent [19]

Holtgrefe, Sr.

[11] Patent Number: 4,765,087
[45] Date of Patent: Aug. 23, 1988

[54] MOLE TRAP

[76] Inventor: Thomas H. Holtgrefe, Sr., 5447 Phillovett Dr., Cincinnati, Ohio 45239

[21] Appl. No.: 61,119

[22] Filed: Jun. 10, 1987

[51] Int. Cl.⁴ .......................................... A01M 23/26
[52] U.S. Cl. ........................................................ 43/94
[58] Field of Search ................. 43/80, 91, 89, 95, 77, 43/85, 88, 94, 97

[56] References Cited

U.S. PATENT DOCUMENTS

| | | | |
|---|---|---|---|
| 280,811 | 7/1883 | Gilleland | 43/94 |
| 288,225 | 11/1883 | Gilleland | 43/94 |
| 472,038 | 4/1892 | Durston | 43/94 |
| 1,296,407 | 3/1919 | Layton | 43/88 |
| 1,923,039 | 8/1933 | Peterson | 43/85 |
| 2,048,135 | 7/1936 | Mygrants | 43/94 |
| 2,525,383 | 10/1950 | Troutman | 43/94 |
| 3,529,377 | 9/1970 | Anderson | 43/91 |

Primary Examiner—Gene P. Crosby
Attorney, Agent, or Firm—Frost & Jacobs

[57] ABSTRACT

The present invention includes a mole trap having a pair of spring-loaded jaws. A platform is pivotally connected to the jaws to limit the travel of the trap into the ground and to stabilize the trap on the ground when it is set. A lever assembly forces the jaws open and sets the trap when the lever reaches an off-center position. An adjustable trigger mechanism is positioned on the ground above a mole borrow. The vibration of a mole traveling beneath the trigger causes the lever assembly to move upward from the off-center position and the jaws to close and destroy the animal.

21 Claims, 3 Drawing Sheets

MOLE TRAP

BACKGROUND OF THE INVENTION

1. Field of the Invention

The present invention discloses an animal trap that is particularly well-suited for destroying moles in their burrows.

2. Description of the Related Art

Traps for destroying moles are well known in the art. Conventional traps include spring-loaded jaws and a trigger. Many traps are set so that the jaws are positioned on either side of a mole burrow or tunnel. A trigger is positioned on the ground above the burrow. When a mole travels between the jaws, vibrations caused by the mole's movement release the trigger so that the jaws close and destroy the mole. Representative examples of such traps are found in U.S. Pat. Nos. 472,038; 1,296,407; 1,923,039 and 2,525,383.

Conventional spring-loaded traps can be unstable when placed in the ground. Particularly after a rain shower, a trap can settle and shift so that a jaw is exposed in the mole burrow, thereby minimizing the chance that a mole will pass between the jaws. Also, the trap may shift so that a mole can pass through the burrow without being caught by the trap. Furthermore, conventional traps can be pushed too far into the ground during installation, thereby decreasing the effectiveness of the trap. Oftentimes, the ground elevation at a mole burrow is rough and uneven. The effectiveness of conventional traps can be decreased as the ground settles away from the trigger.

Consequently, a need exists for improvements in mole traps. It is desirable that a mole trap include an element to stabilize and prevent the trap from shifting after it has been set. It is also desirable that a trap include a trigger which is adjustable to accommodate all types of ground terrain.

SUMMARY OF THE INVENTION

The present invention includes a mole trap that is stabilized on the ground when the trap is set. A platform, connected to the trap, rests on the ground and prevents the trap from being pushed too far into the ground. The present trap also includes a trigger which can be adjusted to accommodate various ground elevations. Once set, the trap cannot be removed from the ground until it is released. The trap has a low profile and shields the trigger from accidental releases. The present mole trap is extremely effective, durable, inexpensive and easy to operate.

In a preferred embodiment, the present invention includes a mole trap having a pair of spring-loaded jaws. A platform is connected to the jaws to limit the travel of the trap into the ground and to stabilize the trap on the ground when it is set. A lever assembly forces the jaws open and sets the trap when a lever reaches an off-center position. An adjustable trigger mechanism is positioned on the ground above a mole burrow. The vibration of a mole traveling beneath the trigger causes the lever assembly to move upwardly from the off-center position so that the jaws close and destroy the animal.

Other features and advantages of the present invention will become more fully apparent from the following detailed description of the preferred embodiment, the appended claims and the accompanying drawings.

DETAILED DESCRIPTION OF PREFERRED EMBODIMENTS

Figure 1:
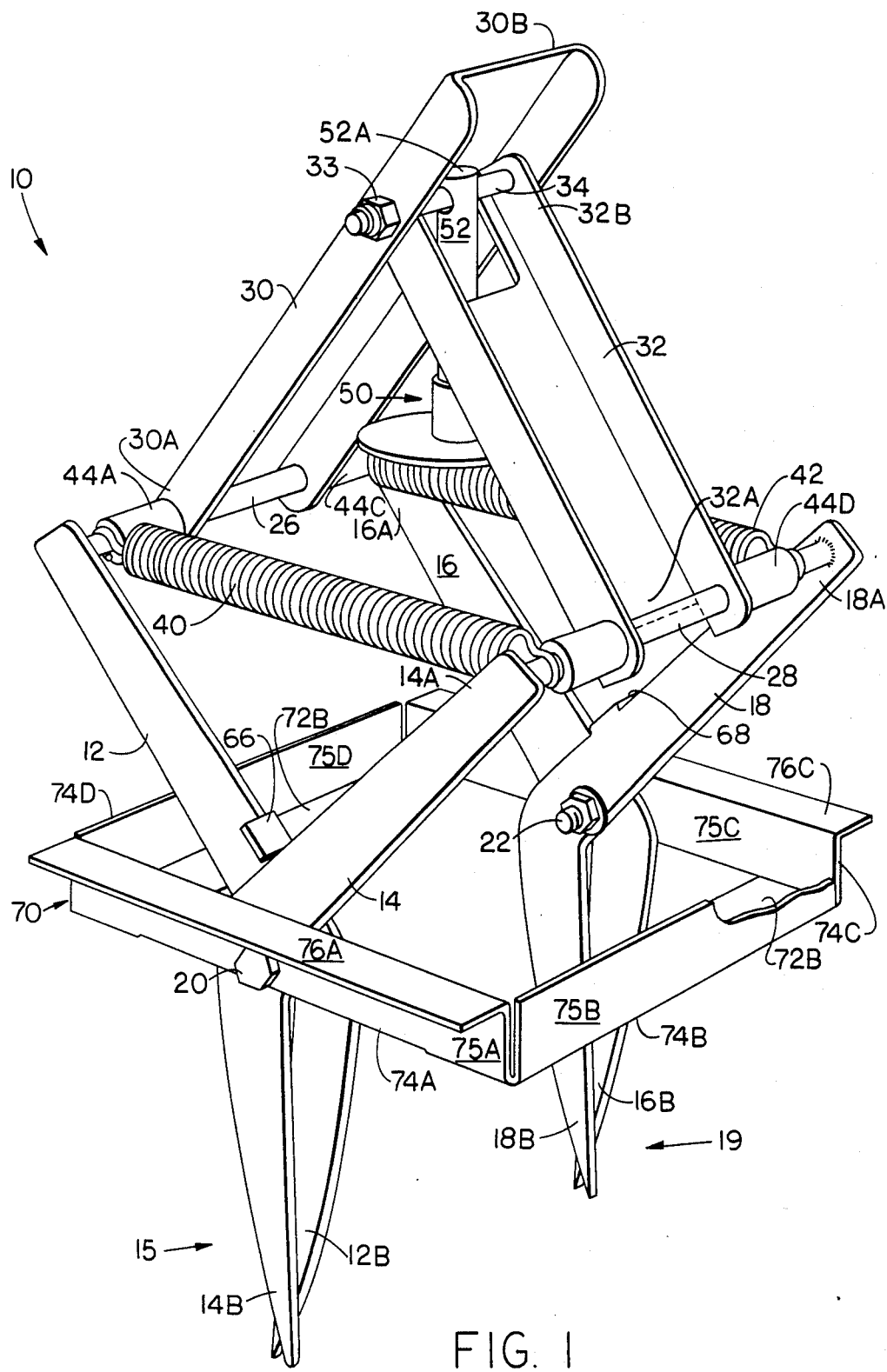
FIG. 1 is a perspective view of a preferred embodiment of the mole trap of the present invention shown in the closed position.
Figure 2:
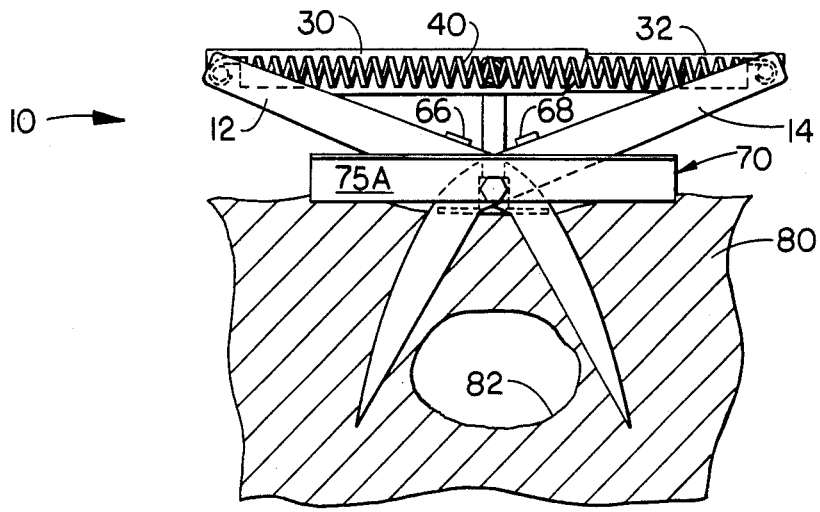
FIG. 2 is a side elevational view of the mole trap of FIG. 1 shown set in the ground adjacent a mole burrow.
Figure 3:
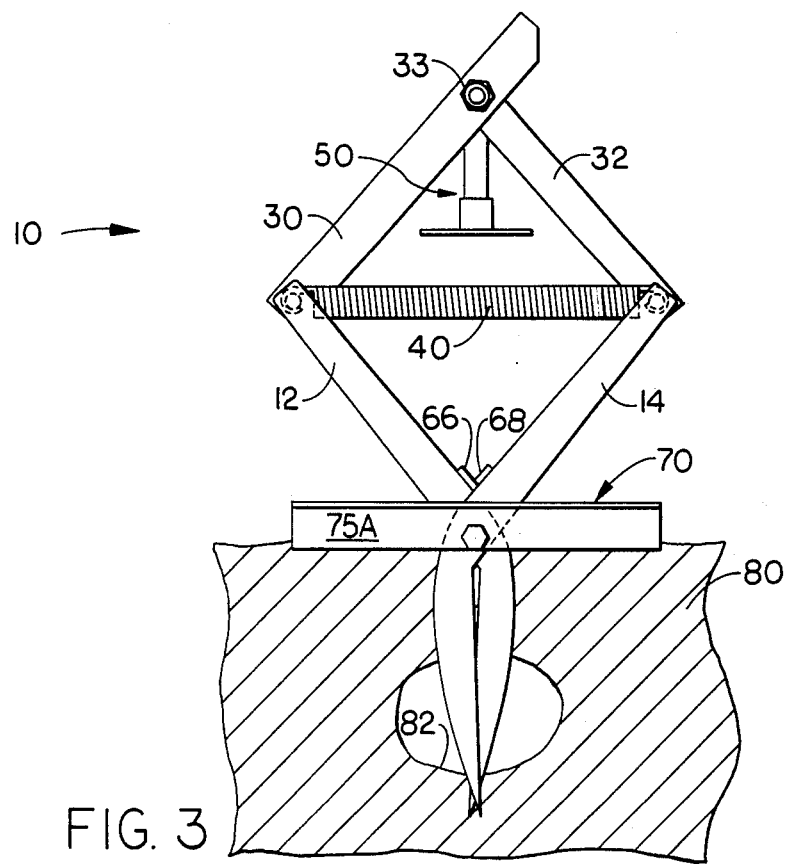
FIG. 3 is a side elevational view of the present mole trap after the trap has been released.

A preferred embodiment of the mole trap of the present invention, indicated generally at 10, is illustrated in FIGS. 1-3. The mole trap 10 includes a first angled member 12 and a second angled member 14. Angled member 12 terminates in a support end 12A and an opposite blade end 12B. Near the mid-point of the angled member 12, member 12 is angled or bent to form an angle greater than 90°. However, other angular configurations for angled member 12 are within the scope of the present invention. In a similar manner, angled member 14 includes a support end 14A and a blade end 14B. Angled members 12 and 14 are hinged together by fastener 20 to form a first jaw 15.

Mole trap 10 also includes angled members 16 and 18 which are hinged together about fastener 22 to form a second jaw 19. A lever assembly 25 is connected to the support ends 12A, 14A, 16A, and 18A of the first and second jaws 15 and 19 to load and set the trap 10. The lever assembly 25 includes a first connecting rod 26 which is secured to support ends 12A and 16A. A second connecting rod 28 is secured to support ends 14A and 18A. A first lever 30 is pivotally connected at its first end 30A to the first connecting rod 26. A second lever 32 is pivotally connected at its first end 32A to the first connecting rod 28. A support bar 34 is pivotally connected to the first lever 30 near the second end 30B of the first lever 30. The second end 32B of the second lever is pivotally connected to the support bar 34. It is preferred that lock washers 33 be used to secure support bar 34 to the first lever 30.

Figure 7:
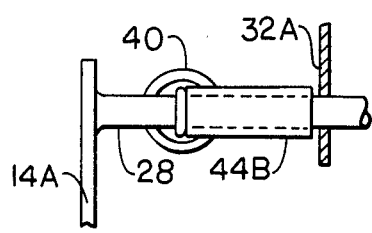
FIG. 7 is a detailed side elevational view of a first embodiment of a spring retainer.

Coil springs 40 and 42 are secured to the first and second connecting rods 26 and 28 on opposite sides of the first and second levers 30 and 32. As illustrated in FIG. 1, spacers 44A through 44D are inserted between the springs 40 and 42 and the levers 30 and 32 to hold the springs 40 and 42 in place. A detailed view of the installation of spacer 44B is illustrated in FIG. 7, wherein spacer 44B is inserted between spring 40 and the first end 32A of the second lever 32. The springs 40 and 42 are selected so that they are not in tension when the first and second jaws 15 and 19 are closed. It is understood that other types of springs can be utilized with the present trap 10. Also, it is possible to incorporate only one spring with the trap 10.

Figure 4:
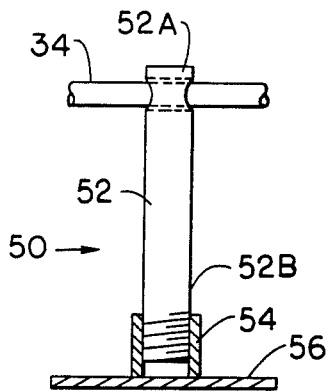
FIG. 4 is a detailed view of a first embodiment of the adjustable trigger mechanism of the present mole trap.

A trigger mechanism, indicated generally at 50, is pivotally connected to the support bar 34. Trigger mechanism 50 includes a trigger rod 52 pivotally connected at its upper end 52A to the support bar 34. As illustrated best in FIGS. 4 and 5, the lower end 52B of trigger rod 52 is threaded. A sleeve nut 54 is secured to a plate 56. As is described below, the sleeve nut 54 is adjusted on the threaded portion 52B of the trigger rod 52 so that the plate 56 rests on the ground. As described below, it is preferred that a loose fit be provided between the trigger rod 52 and the support bar 34.

Figure 5:
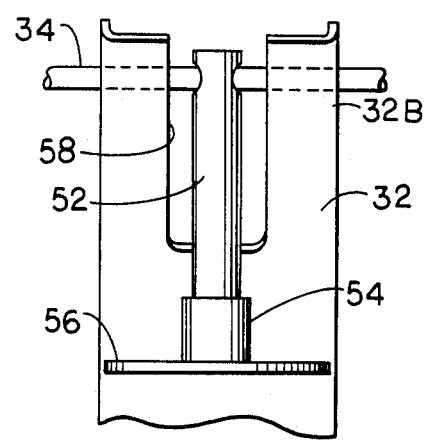
FIG. 5 is a detailed view of the trigger mechanism of FIG. 4 wherein the trigger rod is mounted on a support bar of the second lever.

As illustrated in FIG. 5, it is preferred that an elongated slot 58 be provided in the second end 32B of the second lever 32. The slot 58 guides the trigger rod 52 when the trap 10 is set.

Figure 6:
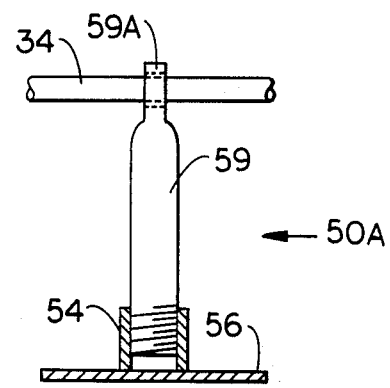
FIG. 6 is a detailed view of a second embodiment of the adjustable trigger mechanism.

An alternate embodiment of the trigger mechanism 50A is illustrated in FIG. 6. A trigger rod 59 includes a flattened, upper portion 59A pivotally connected to the support bar 34. Other elements of trigger mechanism 50A are the same as trigger mechanism 50. As illustrated, it is desirable that a loose fit be provided between the trigger rod 59 and the support bar 34.

Figure 8:
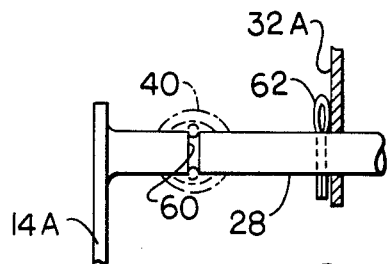
FIG. 8 is a detailed side elevational view of a second embodiment of a spring retainer.

An alternate embodiment of securing spring 40 on connecting rod 28 is illustrated in FIG. 8. A groove 60 is provided in the outer surface of the connecting rod 28 near support end 14A. The end of the spring 40 is secured in groove 60. A cotter pin 62 is inserted in the connecting rod 28 to hold the first end 32A of the second lever 32 in place. Likewise, a second cotter pin (not shown) is placed along the opposite side of the lower end 32A of the second lever 32 to secure the lever 32 on the connecting pin 28.

A platform, indicated generally at 70 is secured to the mole trap 10 by fasteners 20 and 22. A preferred embodiment of the platform 70 is a rectangular structure which includes a planar surface 72 and side elements 74A–74D, as illustrated in FIGS. 1–3. Each side element 74A–74D includes a vertical sidewall 75A–75D. In the embodiment illustrated in FIGS. 1–3, the planar surface 72B and 72D is provided only on side elements 74B and 74D, respectively. However, it is understood that the planar surface 72 can also be provided on side elements 74A and 74C, as desired. The planar surface 72 can extend any desired width so long as it does not interfere with the operation of the first and second jaws 15 and 19.

Sidewalls 75A and 75C are flattened so as to form tops 76A and 76C, respectively. Top 76A and 76B are parallel to planar surfaces 74B and 72D. It will be understood that tops can also be provided on sidewalls 75B and 75D if desired. During installation, force can be applied only at tops 76A and 76C to position the trap 10.

It is preferred that the platform 70 be pivotally connected to the first and second jaws. As illustrated in FIG. 1–3, fasteners 20 and 22 are inserted through sidewalls 75A and 75C. The fasteners 20 and 22 are snugly tighted, thereby permitting the platform 70 to pivot with respect to the remainder of the trap 10.

The installation and operation of the mole trap 10 is illustrated in FIGS. 2 and 3. A force is applied on the second end 30B of the first lever 30 to open the first and second jaws 15 and 19. As a force is applied downwardly, the first and second levers 30 and 32 provide a lever action to force the connecting rods 26 and 28 away from each other against the force of springs 40 and 42. As the first lever 30 approaches an approximate horizontal orientation, the lever 30 is off-center and locks in place so that the first and second jaws 15 and 19 are opened. The jaws 15 and 19 are inserted into the ground 80 on either side of a mole burrow 82. As the trap 10 is inserted into the ground, the platform 70 prevents the trap 10 from being pushed too far into the ground, so that the hinge points 20 and 22 remain above the ground. The planar surfaces 72B and 72D provide a contact surface between the trap 10 and the ground. The platform 70 can be tilted about fasteners 20 and 22 to achieve a desired orientation. Furthermore, the platform 70 stabilizes the trap 10 and prevents the trap 10 from shifting when the trap 10 is set in the ground.

Once the trap 10 is set into position, the sleeve nut 54 is adjusted so that the plate 56 comes into contact with the ground 80 above the mole burrow 82. The loose fit provided between the trigger rod 52 and the support bar 34 permits angular movement so that the plate 56 can be oriented to accommodate various ground terrains.

When a mole travels in the mole burrow 82, vibrations are transmitted through the ground to the plate 56. As the plate 56 is nudged upwardly, the first and second levers 30 and 32 are forced upwardly and out of a locked position. Springs 40 and 42 immediately close the first and second jaws 15 and 19 to destroy the animal. In FIG. 3, the trap 10 is shown in a closed position in the mole burrow 82.

When set (see FIG. 2), the trap 10 has a low profile close to the ground 80. When set in the ground 80, the trap 10 cannot be removed until the trap 10 is released since the blade ends 12B, 14B, 16B and 18B have pushed soil away from the burrow 82 but not above their locked position. The ground 80 above the blade ends 12B, 14B, 16B and 18B has not been distributed and prevents the trap 10 from being removed until the trap 10 is released.

As illustrated in FIG. 2, the trigger mechanism 50 is shielded by support ends 12A, 14A, 16A and 18A and levers 30 and 32. Therefore, the upper construction of the trap prevents any accidental releases of the trap 10.

It is preferred that a stop be provided on the angled members 12, 14, 16 and 18 to limit the range of motion when the jaws 15 and 19 are closed. A flange 66 is provided near the mid-point of angled member 12. In a similar manner, a flange 68 is provided on angled member 18. Flanges 66 and 68 are oriented so as to be perpendicular with angled members 14 and 16, respectively. When the jaws are not open, the range of closure is limited as flanges 66 and 68 engage angled members 14 and 16, respectively, thereby preventing injury to fingers or hands that are between support ends 12A, 14A, 16A and 18A. It is understood that flanges can be provided on angled members 14 and 16 in orientation so as to engage angled members 12 and 18, if desired. Also, it is understood that only one flange may be used if desired.

It is preferred that the mole trap 10 be constructed from stainless steel to resist weather and corrosion. Furthermore, it is difficult for a mole to smell the stainless steel thereby making the animal unaware that the trap is set in place about its burrow.

Although the present invention has been described with reference to preferred embodiments, workers skilled in the art will recognize that changes may be made in form and detail without departing from the spirit and scope of the invention.

What is claimed is:

1. A mole trap comprising:

(a) a first pair of angled members hinged together to form a first jaw, wherein each angled member terminates in a blade end and an opposite support end;

(b) a second pair of angled members hinged together to form a second jaw, wherein each angled member terminates in a blade end and an opposite support end;

(c) lever means connected to the support ends of the first and second jaws for setting the trap;

(d) trigger means pivotally connected to the lever means for releasing the trap; and (e) a platform, connected to the first and second jaws at their respective hinge points, having a planar surface which rests on the ground when the trap is set to stabilize the trap on the ground.

2. The mole trap as specified in claim 1 wherein the trigger means is adjustable to accommodate the height of the ground.

3. The mole trap as specified in claim 1 wherein the platform is pivotally connected to the first and second jaws.

4. The mole trap as specified in claim 1 wherein when the trap is set, the trigger means is shielded by the support ends of the first and second jaws and the lever means to prevent accidental releases of the trap.

5. The mole trap as specified in claim 1 wherein the lever means comprises:

(a) a first connecting rod secured to the support ends of one of the angled members of the first jaw and a complementary angled member of the second jaw;

(b) a second connecting rod secured to the support ends of the remaining angled members of the first and second jaws;

(c) spring means connected to the first and second connecting rods for biasing the jaws in a closed position;

(d) a first lever pivotally connected to the first connecting rod; and (e) a second lever pivotally connected at a first end to the second connecting rod and pivotally connected at a second end to the first lever.

6. The mole trap as specified in claim 5 wherein the second lever is pivotally connected to a support bar secured to the first lever.

7. The mole trap as specified in claim 6 wherein the trigger means is pivotally connected to the support bar.

8. The mole trap as specified in claim 6 including an elongated slot provided in the portion of second lever connected to the bar for guiding the trigger means.

9. The mole trap as specified in claim 7 wherein the trigger means is adjustable to accommodate the height of the ground.

10. The mole trap as specified in claim 9 wherein the trigger means comprises:

a trigger rod pivotally connected to the support bar, at a first end and having a threaded portion at a second end;

(b) a sleeve nut threaded to the trigger rod; and (c) a plate connected to the sleeve nut, wherein the height of the plate is adjusted by the sleeve nut to accommodate the ground elevation.

11. The mole trap as specified in claim 1 including stop means provided on at least one angled member of at least one jaw to limit the range of motion of the support ends when the trap is released.

12. The mole trap as specified in claim 1 wherein the angled members are constructed from stainless steel.

13. The mole trap as specified in claim 1 wherein the platform is constructed from stainless steel.

14. A mole trap to be located and set in the ground adjacent a mole burrow, comprising:

(a) a pair of spring-loaded jaws;

(b) lever means connected to the jaws for setting the trap;

(c) trigger means captively connected to and movable with the lever means for releasing the trap; and (d) a platform connected to the jaws for preventing the trap from being forced beyond a predetermined amount into the burrow and to stabilize the trap on the ground.

15. The mole trap as specified in claim 14 wherein the platform comprises a rectangular structure having a planar surface which rests on the ground when the trap is set.

16. The mole trap as specified in claim 15 wherein the platform is pivotally connected to the jaws.

17. The mole trap as specified in claim 16 wherein the trigger means is adjustable to accommodate the height of the ground.

18. The mole trap as specified in claim 17 wherein the lever means comprises a first lever and a second lever pivotally connected to the jaws and each other so that when the levers are forced into an off-center horizontal position, the jaws are forced open to set the trap.

19. The mole trap as specified in claim 18 wherein the trigger means is pivotally connected to the second lever.

20. The mole trap as specified in claim 19 wherein the trigger means comprises:

(a) a trigger rod pivotally connected to the second lever at a first end and having a threaded portion at a second end;

(b) a sleeve nut threaded to the trigger rod; and (c) a plate connected to the sleeve nut, wherein the height of the plate is adjusted by the sleeve nut to accommodate the ground elevation.

21. The mole trap as specified in claim 20 including stop means provided at least to limit the range of closure of the jaws when the trap is released.

* * * * *